Figure 1:
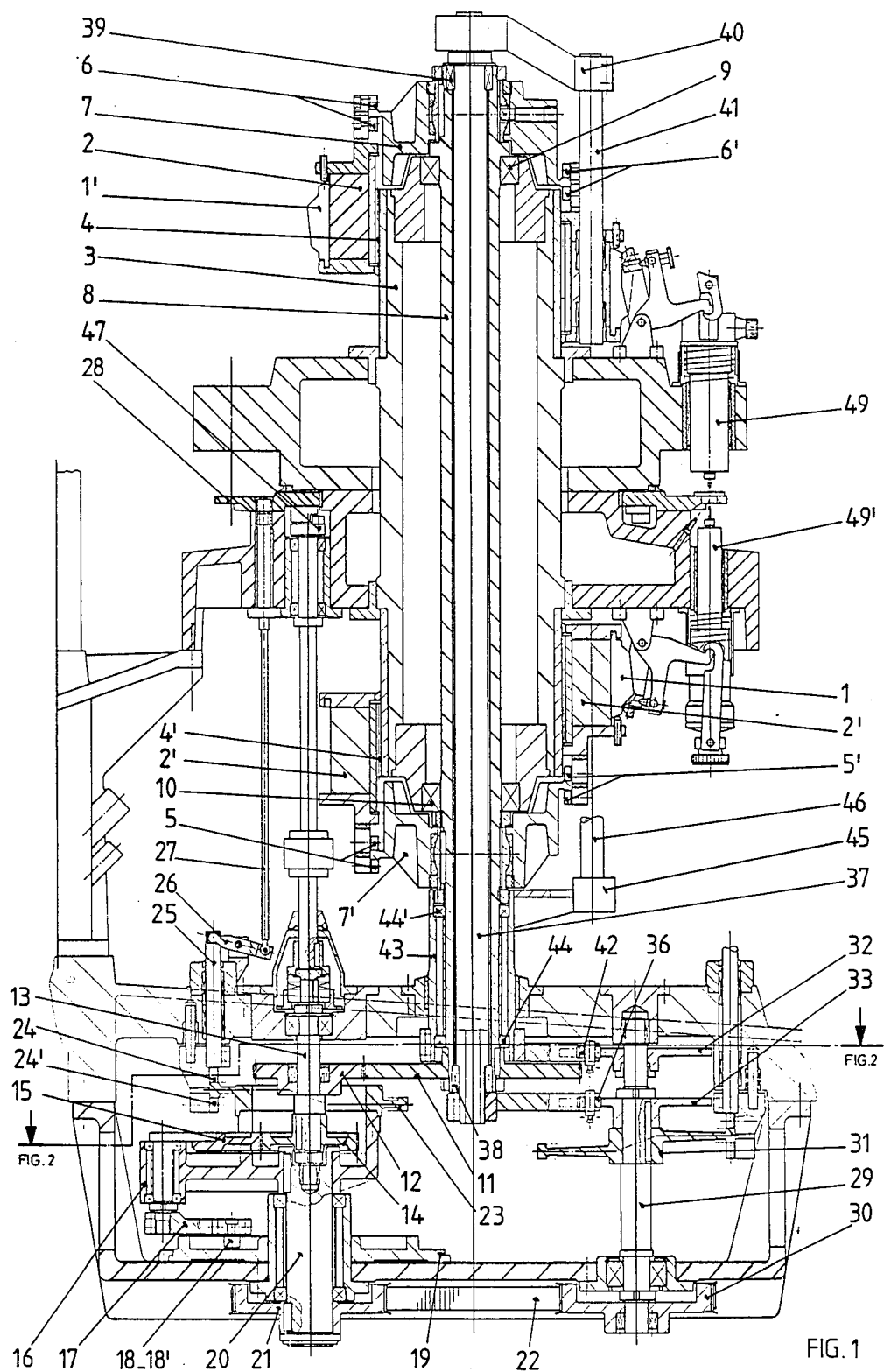

United States Patent [19]

Buzzi

[11] Patent Number: 4,862,569
[45] Date of Patent: Sep. 5, 1989

[54] MACHINE WITH A TABLE WITH INTERMITTENT ROTATION

[75] Inventor: Ugo Buzzi, Arzo, Switzerland

[73] Assignee: Azypatent AG, Vaduz, Liechtenstein

[21] Appl. No.: 269,015

[22] Filed: Nov. 9, 1988

[30] Foreign Application Priority Data

Mar. 8, 1988 [CH] Switzerland .................... 852/88

[51] Int. Cl.⁴ .................... B23B 39/20; B23P 19/04
[52] U.S. Cl. .................... 29/38 C; 29/38 D; 29/53
[58] Field of Search .............. 29/33 P, 791, 792, 38 A, 29/38 B, 38 R, 38 D, 38 C, 37 R, 41, 742, 43, 44, 50, 54; 408/45

[56] References Cited

U.S. PATENT DOCUMENTS

| | | | |
|---|---|---|---|
| 1,907,550 | 5/1933 | Knowles | 29/38 C |
| 2,272,055 | 2/1942 | Carlson | 29/38 D |
| 3,056,981 | 10/1962 | Byam | 408/45 X |
| 3,689,965 | 9/1972 | Bertoglio | 29/38 C |
| 4,184,236 | 1/1980 | Nutt | 29/38 R |
| 4,351,096 | 9/1982 | Depweg et al. | 29/38 A |
| 4,473,930 | 10/1984 | Bezner et al. | 29/38 C |
| 4,523,359 | 6/1985 | Gippa | 29/38 A |

FOREIGN PATENT DOCUMENTS

| | | | |
|---|---|---|---|
| 83304 | 7/1983 | European Pat. Off. | 29/38 R |
| 617242 | 7/1978 | U.S.S.R. | 29/38 B |

Primary Examiner—William Briggs
Attorney, Agent, or Firm—Young & Thompson

[57] ABSTRACT

Machine with a table with intermittent rotation makes it possible to perform with great rapidity the working and assembly of parts requiring great precision. It comprises operating units (49, 49') placed above, below and at the side of rotating table (28), and cylindrical bodies (2, 2') to which are fastened linear cams (1, 1'), said bodies during a work cycle perform an axial movement transmitting the advance and return movement to the operating units by radial linear cams (1, 1'), and during an idle time, bodies (2, 2') are rotated angularly so that the return to their initial position takes place without influencing said operating units (always during idle time). Linear cams (1, 1') are fastened to bodies (2, 2') mutually movable in opposite directions, both axially and angularly, to balance the forces due to the various masses in very rapid movement and their notable accelerations.

8 Claims, 2 Drawing Sheets

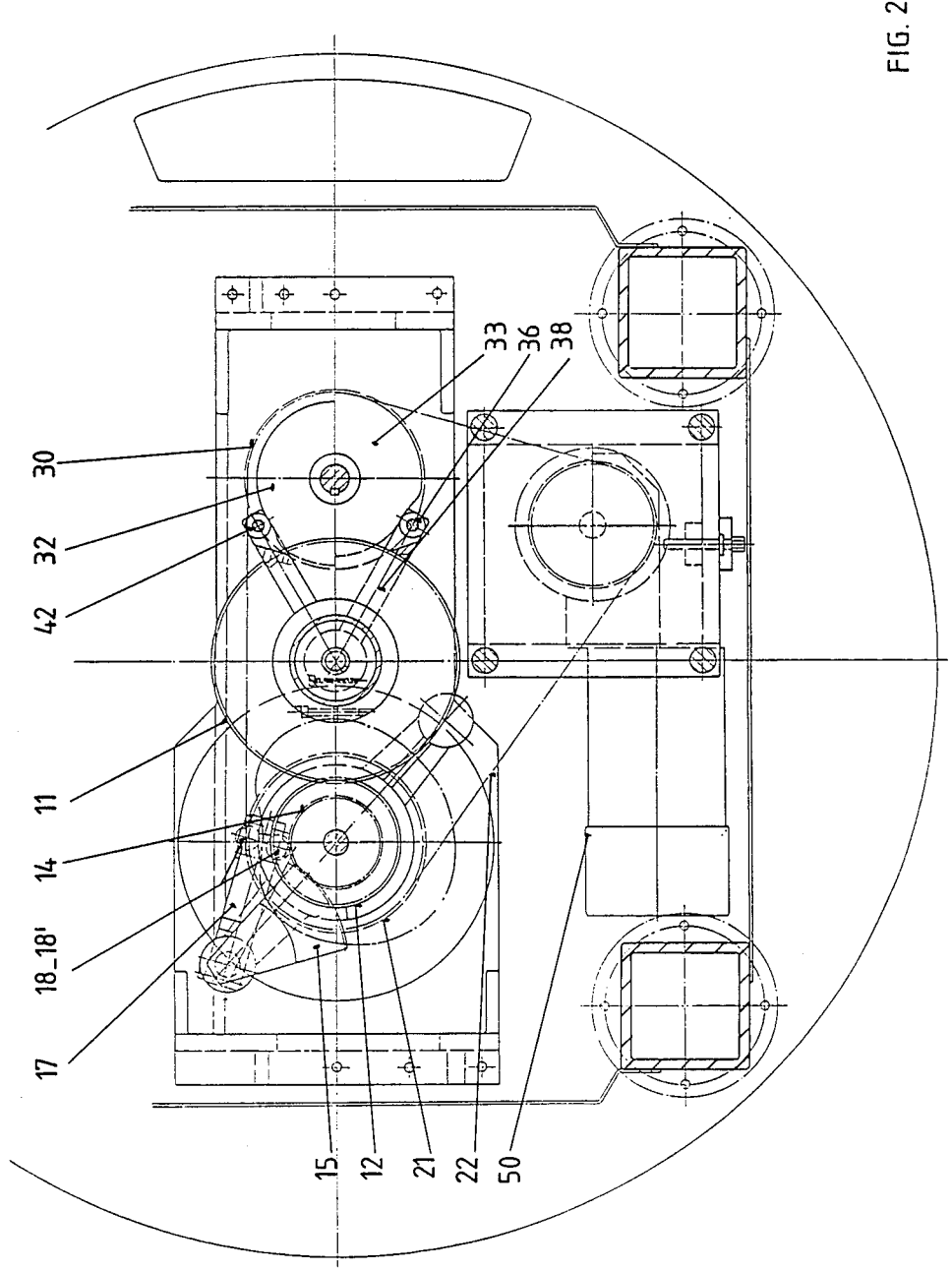

MACHINE WITH A TABLE WITH INTERMITTENT ROTATION

There is known from the same applicant (see European patent No. EP 83 304 issued Mar. 18, 1987) a machine with a table with intermittent rotation to perform with great rapidity the working and assembly of parts requiring great precision, comprising operating units placed above, below and at the side of the rotating table, and elements, which, during a work cycle perform an axial movement, transmitting the advance and return movement to the operating units by radial linear cams, and during an idle time, i.e., a time used to calibrate the rotating table, are rotated angularly so that the radial linear cams are not in contact with said operating units and in this position the return of the central shaft to its initial position is performed without influencing said operating units; control of the advance of the various operating units can be performed at the same time for all the units or groups of units, or independently of one another.

The machine according to the invention differs from that just cited in being characterized in that linear cams are fastened to bodies mutually movable in opposite directions, either axially or angularly, to balance the forces acting on the various masses and due to the mutual accelerations during their very rapid axial and angular movements.

In this mode the machine in question makes it possible to achieve much higher work speeds with respect to the one cited and to known machines, by reducing the time used for the various operations and therefore by notably reducing the processing cost per piece.

The accompanying drawings represent a preferred nonlimiting and nonbinding embodiment of the machine in question.

FIG. 1 represents it in axial section.

FIG. 2 in partial section along the line marked "FIG. 2" in FIG. 1.

The characteristic of the machine in question is the control of advances of operating units (49, 49') independent of one another by linear cams (1, 1').

Said linear cams are located on cylindrical bodies 2, 2' which are moved in opposition both in the axial direction and in the angular direction. This is obtained as follows: during the work cycle, cylindrical bodies 2, 2' perform a vertical movement and transmit, as mentioned, the advances to operating units (49, 49') by linear cams 1, 1' i.e., during a single vertical movement of cylindrical bodies 2, 2', the work and return phase of operating units 49, 49' follow. During an idle time, i.e., a time used to move and position rotating table 28 intermittently, cylindrical bodies 2, 2' are rotated a certain angle so that radial linear cams 1, 1' are no longer in contact with said operating units 49, 49' and in this position cylindrical bodies 2, 2' are returned to the starting position, always by cams 7, 7', without influencing said operating units 49, 49'.

The main difference of this design with respect to European Pat. No. EP 83 304 therefore consists in the fact that hollow cylindrical bodies 2, 2' are automatically controlled by cams 7, 7', which are solid with shaft 8. Shaft 8 in turn is connected, by gears 11, 22 to a mechanism formed by a gear wheel 14, a toothed segment 15, body 16, lever 17, rollers 18, 18' and stationary cam 19. Said mechanism makes it possible to modify the continuous rotary movement of motor 50, as described in European Pat. No. EP 83304.

Said mechanism also controls Geneva movement 47 for movement of table 28.

The advantages of this design with respect to said European patent are the following:

1. The vertical movements of cylindrical bodies 2, 2' are opposite one another, to compensate the forces due to their masses and accelerations.

2. Shaft 8, solid with cams 7, 7' is controlled by the same mechanism that controls Geneva movement 47. This makes it possible to perform the return of cylindrical bodies 2, 2', in a mode that is extremely fast and automatically synchronized with the movement of table 28. Further, since the rotary movement of shaft 8 is opposite that of the Geneva movement (the reversal comes about by gear wheels 12 and 11), the acceleration forces of table 28 and shaft 8 are also compensated.

3. The angular movement of cylindrical bodies 2, 2' (to cause linear cams 1, 1' not to be in contact with operating units 49, 49' during the vertical return movement of the cylindrical bodies themselves) is the opposite of one another.

Said angular movements are controlled by cams 32, 33. Therefore the forces due to accelerations arising from said angular movements are perfectly compensated.

Further, there is a further advantage: the control levers of upper and lower operating units 49, 49' are identical.

The various elements that make up the machine in question will now be described in detail.

Work units 49, 49', ect., are controlled, as said, by linear cams 1, 1'.

Said cams are fastened to cylindrical bodies 2, 2'. Cylindrical bodies 2, 2' can slide on central shaft 3 by ball bearing cages 4, 4' that allow the axial and angular movement.

Cylindrical bodies 2, 2' carry at their ends two pairs of rollers 5, 5' 6, 6' that engage in barrel cams 7, 7'. Cams 7, 7' are fastened to shaft 8.

Shaft 8 is fastened by bearings 9, 10, and carries at its end gear wheel 11, which meshes with the other gear wheel 12. Gear wheel 12 is fastened to shaft 13.

To shaft 13 is also fastened gear wheel 14, which, in turn, meshes with toothed sector 15.

Toothed sector 15 is fastened, by bearings, to body 16 and carries, at its end, lever 17.

To lever 17 are fastened 2 rollers 18, 18' that are coupled to cam 19.

Body 16 is solid with a first auxiliary shaft 20, which carries, at its end, gear wheel 21.

Gear wheel 21 is put in rotation by belt 22.

To body 16 is fastened a barrel cam 23, which, by rollers 24, 24' and levers 25, 26, 27, controls indexing of rotary table 28.

A second auxiliary shaft 29 is also controlled by belt 22 by gear wheel 30.

Shaft 29 carries barrel cam 31, which controls a second index and cams 32, 33.

Cam 33 controls, by rollers 36, inside shaft 37, coaxial with central shaft 8.

Shaft 37 is connected by bearings 38, 39 to central shaft 8 and controls, by lever 40 and pin 41, the angular positioning of upper body 2.

Cam 32 controls, by rollers 42, the angular position of shaft 43 in turn connected by bearings 44, 44' to shaft 8.

Shaft 43 controls, by lever 45 and pin 46, angular positioning of body 2'. The functioning is the following:

- belt 22, controlled by a motor, puts into rotation shafts 20 and 29 and, consequently, body 16, cam 23 solid with shaft 20, cams 31, 33 and 32 solid with shaft 29;
- shaft 13 is put into rotation by toothed sector 15 and gear wheel 14, which makes it possible to accelerate or decelerate the rotary movement of belt 22;
- in this way, by the same law of acceleration, Geneva movement 47 is controlled, which controls rotary table 28 and shaft 8 (by gear wheel 12, 11);
- bodies 2' and 2 are thus controlled axially by barrel cams 7 and 7'.

The axial movements of bodies 2' and 2 are symmetrically opposite, so that the masses and acceleration forces are perfectly compensated.

Also the angular movement of bodies 2, 2' are opposite one another, so that the the acceleration forces are compensated.

Also the angular acceleration forces of rotary table 28 are compensated by the acceleration of cams 7' and 7, because the rotation of cams 7' and 7 is opposite with respect to the rotation of rotary table 28 (gears wheel 12 and 11 reverse the direction of rotation).

The advantage of this machine, as pointed out above, is the possibility of achieving very high speeds, all forces of acceleration of the masses being directly compensated.

I claim:

1. Machine with a table with intermittent rotation to perform with great rapidity the working and assembly of parts requiring great precision, comprising operating units placed adjacent the rotating table, and elements, which, during a work cycle perform an axial movement transmitting the advance and return movement to the operating units by radial linear cams, and during an idle time are rotated angularly so that the radial linear cams are not in contact with said operating units and in this position the return of said elements to their initial position is performed without influencing said operating units; the improvement comprising linear cams (1, 1') fastened to bodies (2, 2'), means for mutually moving said bodies in opposite directions, both axially and angularly, to balance the forces due and means transmitting movement from said cams to said operating units.

2. Machine according to claim 1, wherein said bodies (2, 2') are hollow cylindrical bodies and are independently controlled by barrel cams (7, 7') solid with a central shaft (8).

3. Machine according to claim 2, wherein said hollow cylindrical bodies (2, 2') can slide in opposite directions on a hollow shaft (3) coaxial with respect to said central shaft (8) by ball bearing cages (4, 4'); said bodies (2, 2') carrying at their ends two pairs of rollers (5, 5'-6, 6') which engage in barrel cams (7, 7') fastened to said central shaft (8).

4. Machine according to claim 3, wherein said central shaft (8) turn is connected, by gears (11, 12) to a mechanism formed by a gear wheel (14), a toothed segment (15), a body (16), a lever (17), rollers (18, 18') and a stationary cam (19) to modify the continuous rotary movement of control motor (50).

5. Machine according to claim 4, wherein said mechanism also controls a Geneva movement (47) for the intermittent movement of said table (28).

6. Machine according to claim 4, wherein said body (16) is solid with a first auxiliary shaft (20) that carries at its end a gear wheel (21) put into rotation by a belt (22); to said body (16) is connected a barrel cam (23) which, by rollers (24, 24') and levers (25, 26, 27), controls indexing said rotating table (28).

7. Machine according to claim 6, characterized by a second auxiliary shaft (29), also controlled, by a gear wheel (30), by said belt (22), which carries a barrel cam (31) which controls a second index for said table and two cams (32, 33), of which a second cam (33) controls, by rollers (36), an inside shaft (37) coaxial with respect to said central shaft (8), connected to it by bearings (38, 39) and controlling, by a lever (40) and a pin (41), the angular positioning of a said movable body (2).

8. Machine according to claim 7, wherein said first cam (32) of said second auxiliary shaft (29) controls, by rollers (42), the angular position of an outside shaft (43) coaxial with respect to said central shaft (8); and in turn is connected by bearings (44, 44') to said central shaft (8); said outside shaft (43) controlling, by a lever (45) and a pin (46), the angular positioning of a said body (2').

* * * * *